(12) United States Patent
Mathew et al.

(10) Patent No.: US 12,348,139 B2
(45) Date of Patent: Jul. 1, 2025

(54) LOWERING INDUCTOR PEAK CURRENT IN DCDC DIGITAL CONTROLLER

(71) Applicant: TEXAS INSTRUMENTS INCORPORATED, Dallas, TX (US)

(72) Inventors: Rinu Mathew, Bangalore (IN); Vineet Khurana, Delhi (IN); Anand Kumar G, Bangalore (IN); Aniruddha Periyapatna Nagendra, Bangalore (IN); Harikrishna Parthasarathy, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 330 days.

(21) Appl. No.: 18/169,014

(22) Filed: Feb. 14, 2023

(65) Prior Publication Data
US 2024/0275283 A1 Aug. 15, 2024

(51) Int. Cl.
*H02M 3/158* (2006.01)
*H02J 7/00* (2006.01)

(52) U.S. Cl.
CPC ............. *H02M 3/158* (2013.01); *H02J 7/007* (2013.01); *H02J 2207/20* (2020.01)

(58) Field of Classification Search
CPC ....... H02M 3/158; H02J 2207/20; H02J 7/007
See application file for complete search history.

(56) References Cited

U.S. PATENT DOCUMENTS

| | | |
|---|---|---|
| 11,205,915 B2 | 12/2021 | Carpenter, Jr. |
| 2006/0259098 A1* | 11/2006 | Erickson .............. A61N 1/3787 607/33 |
| 2009/0048643 A1* | 2/2009 | Erickson ................ A61N 1/378 607/59 |
| 2011/0148374 A1 | 6/2011 | Gizara |
| 2017/0012526 A1 | 1/2017 | Chen |
| 2020/0284883 A1* | 9/2020 | Ferreira ................ G01S 7/4815 |
| 2021/0075214 A1 | 3/2021 | Schaevitz |
| 2021/0234548 A1* | 7/2021 | Tangirala .............. H03M 1/468 |

FOREIGN PATENT DOCUMENTS

JP 2009106097 A 5/2009

* cited by examiner

*Primary Examiner* — Rafael O De Leon Domenech
(74) *Attorney, Agent, or Firm* — Brian D. Graham; Frank D. Cimino

(57) ABSTRACT

In an example, a voltage converter includes a pulse generator. The voltage converter also includes a high-side transistor having a gate coupled to the pulse generator, a source coupled to a first voltage terminal, and a drain coupled to an output node. The voltage converter includes a low-side transistor having a gate coupled to the pulse generator, a source coupled to a second voltage terminal, and a drain coupled to the output node. The voltage converter includes a charge lookup table coupled to the pulse generator, where the charge lookup table is configured to provide a charge duration. The voltage converter includes a discharge lookup table coupled to the pulse generator, where the discharge lookup table is configured to provide a discharge duration. The voltage converter also includes a latch coupled to the charge lookup table, where the latch is configured to store an indication of a supply voltage.

20 Claims, 4 Drawing Sheets

LOWERING INDUCTOR PEAK CURRENT IN DCDC DIGITAL CONTROLLER

BACKGROUND

A DC (direct current) to DC voltage converter receives an input voltage and converts it to an output voltage to drive a load. DC-DC converters may be useful in microcontrollers as on-chip voltage regulators. DC-DC converters may have higher power conversion efficiency than low dropout regulators, which reduces power consumption. Some systems with DC-DC converters, such as wireless transceivers, may have to meet power consumption requirement standards.

SUMMARY

In accordance with at least one example of the disclosure, a voltage converter includes a pulse generator. The voltage converter also includes a high-side transistor having a gate coupled to the pulse generator, a source coupled to a first voltage terminal, and a drain coupled to an output node. The voltage converter includes a low-side transistor having a gate coupled to the pulse generator, a source coupled to a second voltage terminal, and a drain coupled to the output node. The voltage converter also includes a charge lookup table coupled to the pulse generator, where the charge lookup table is configured to provide a charge duration. The voltage converter includes a discharge lookup table coupled to the pulse generator, where the discharge lookup table is configured to provide a discharge duration. The voltage converter also includes a latch coupled to the charge lookup table, where the latch is configured to store an indication of a supply voltage.

In accordance with at least one example of the disclosure, a method includes receiving a supply awareness trigger in a voltage converter. The method includes, responsive to receiving the supply awareness trigger, performing a supply awareness measurement, where the supply awareness measurement determines a supply voltage level. The method also includes storing an indication of the supply voltage level in a latch. The method includes receiving, at a pulse generator, a signal to increase an output voltage of the voltage converter. The method also includes reading, by the pulse generator, the indication of the supply voltage level stored in the latch. The method includes charging the output voltage with the pulse generator based at least in part on the indication of the supply voltage level.

In accordance with at least one example of the disclosure, a system includes a pulse generator and a supply awareness trigger generator configured to trigger a supply awareness measurement, where the supply awareness measurement determines a difference between a supply voltage level and an output voltage. The system also includes a high-side transistor having a gate coupled to the pulse generator, a source coupled to a first voltage terminal, and a drain coupled to an output node. The system includes a low-side transistor having a gate coupled to the pulse generator, a source coupled to a second voltage terminal, and a drain coupled to the output node, where the high-side transistor and the low-side transistor produce the output voltage. The system also includes a charge lookup table coupled to the pulse generator, where the charge lookup table is configured to provide a charge duration based on the supply awareness measurement and a peak current setting. The system includes a discharge lookup table coupled to the pulse generator, where the discharge lookup table is configured to provide a discharge duration based on the peak current setting. The system also includes a latch coupled to the charge lookup table, where the latch is configured to store the supply awareness measurement.

BRIEF DESCRIPTION OF THE DRAWINGS

The same reference numbers or other reference designators are used in the drawings to designate the same or similar (functionally and/or structurally) features.

DETAILED DESCRIPTION

DC-DC converters may be required to meet industry or commercial efficiency standards. In some DC-DC converters, a digital controller drives high-side and low-side transistors that provide power to an inductive load. After an inductor charging phase begins, the DC-DC converter performs a supply awareness (SA) measurement. The SA measurement includes a health check of the voltage supply, such as a battery. The SA measurement is performed so a controller within the DC-DC converter can maintain the peak inductor current at a constant value regardless of the supply or battery voltage level during the inductor charging phase. To maintain a constant peak inductor current value, the SA measurement provides the DC-DC converter with a number of charging pulses to use during the charging phase. However, during the time taken to perform the SA measurement, the inductor current rises due to the controller charging the inductor. If the SA measurement takes too long, the rise in inductor current leads to lower power conversion efficiency.

In examples herein, the SA measurement is decoupled from the inductor charging phase. Specifically, the DC-DC converters described herein trigger an SA measurement to determine supply voltage health at regular intervals, independent of the inductor charging phase performed by the DC-DC converter. The trigger rate for the SA measurement may be any suitable value, and may be configurable. An SA measurement value is latched each time the SA measurement is performed, and the controller checks the latched SA value to determine the number of charging pulses or charging cycles for the inductor charging phase. Because the latched SA value is used rather than performing an SA measurement during the inductor charging phase, the charging time for the inductor may be as low as one clock cycle and does not depend on the timing of the SA measurement.

In examples herein, the DC-DC converter achieves higher efficiency for a given inductor value compared to previous systems. The improved efficiency helps to achieve lower device active power and BLUETOOTH® low energy (BLE) radio transmit and receive power consumption targets. The solution also enables the DC-DC converter to use smaller inductor values as the peak current is adjustable. Material costs may be reduced as well due to the use of the smaller inductor. The SA trigger rate may be adjusted based on the type and variation of power supply used. For example, systems with a noisy or inconsistent power supply may have a higher SA trigger rate than systems with more stable power supplies.

Figure 1:
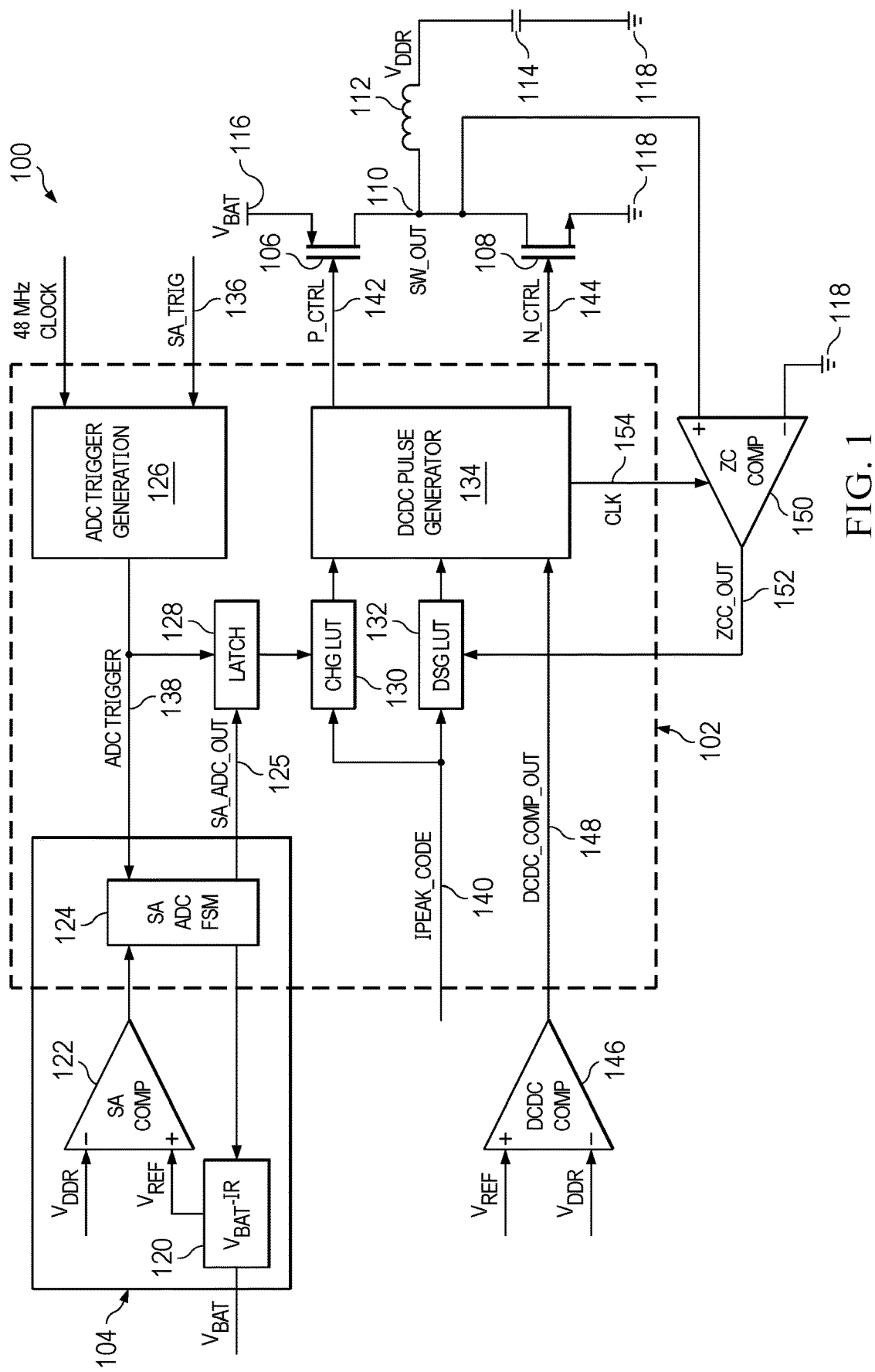
FIG. 1 is a circuit schematic diagram of a system for controlling inductor peak current in a DC-DC converter in accordance with various examples.

FIG. 1 is a circuit schematic diagram of a system 100 for controlling inductor peak current in a DC-DC converter in accordance with various examples herein. System 100 includes a digital controller 102 and an SA analog-to-digital converter (ADC) 104. System 100 includes a high-side transistor 106, a low-side transistor 108, and a switching output node (SW_OUT) 110. The high-side transistor 106 and the low-side transistor 108 may be field effect transistors (FETs), metal-oxide semiconductor FETs (MOSFETs), or any other suitable type of transistors. In this example, high-side transistor 106 is a p-type FET and low-side transistor 108 is an n-type FET.

System 100 also includes an inductor 112 and a capacitor 114. The inductor 112 and capacitor 114 may be external to a device that includes other components in system 100, such as a microchip or an integrated circuit. Inductor 112 may be coupled to SW_OUT node 110 via a device pin in one example. An output voltage $V_{DDR}$ may be provided between inductor 112 and capacitor 114. In one example, inductor 112 is approximately 10 microhenry (µH) and capacitor 114 is approximately 10 microfarad (µF). In other examples, smaller values of the inductor may be used, such as 4.7 µH or 2.2 µH, because the peak current is adjustable. This helps lower overall material cost as described above. System 100 also includes a voltage terminal 116 that provides a voltage $V_{BAT}$. $V_{BAT}$ may be provided by a battery in one example. System 100 also includes a second voltage terminal that may be coupled to a ground 118. High-side transistor 106 has a source coupled to voltage terminal 116, a drain coupled to SW_OUT node 110, and a gate (or control terminal) coupled to digital controller 102. Low-side transistor 108 has a source coupled to ground 118, a drain coupled to SW_OUT node 110, and a gate (or control terminal) coupled to digital controller 102.

SA ADC 104 includes a voltage reference generator 120, an SA comparator (SA COMP) 122, and an SA ADC finite state machine (FSM) 124. In one example, SA ADC FSM 124 is in digital controller 102. SA ADC FSM 124 may include any hardware, software, or digital logic configured to implement the actions described herein. SA ADC FSM 124 produces an output code (described below) based on an input receive from SA COMP 122. In other examples, the functions of SA ADC FSM 124 may be performed by software, digital logic, circuitry, etc. Voltage reference generator 120 includes an input that receives a voltage $V_{BAT}$ and an output that produces a reference voltage $V_{REF}$. $V_{REF}$ may be an internal bandgap reference voltage in one example. Voltage reference generator 120 may be a voltage converter that provides the $V_{REF}$ voltage from the $V_{BAT}$ voltage. SA COMP 122 includes a first comparator input (e.g., a non-inverting input) that receives the voltage $V_{REF}$ from voltage reference generator 120. SA COMP 122 includes a second comparator input (e.g., an inverting input) that receives the voltage $V_{DDR}$. $V_{DDR}$ is the voltage provided by system 100 at the output between inductor 112 and capacitor 114. SA COMP 122 includes a comparator output coupled to SA ADC FSM 124. SA COMP 122 compares the voltage $V_{REF}$ to $V_{DDR}$, and provides the difference to SA ADC FSM 124. SA ADC FSM 124 receives the voltage difference and produces the code that indicates the voltage difference. The voltage difference is the amount of voltage that $V_{DDR}$ should be raised to match $V_{REF}$. The code may be stored and used as described below to determine the amount of charge pulses provided by pulse generator 134 to raise $V_{DDR}$ to $V_{REF}$.

Digital controller 102 includes ADC trigger generation block 126, latch 128, charge lookup table (CHG LUT) 130 (e.g., a data structure stored in memory), discharge LUT (DSG LUT) 132 (e.g., a data structure stored in memory), and pulse generator 134. ADC trigger generation block 126 includes a first input that receives a high-speed clock, such as a 48 MHz clock in one example. This clock may be a system clock or may be generated by a system clock. ADC trigger generation block 126 includes a second input that receives an SA trigger (SA_TRIG) signal 136. ADC trigger generation block 126 includes an output that provides an ADC Trigger signal 138 that is provided to SA ADC FSM 124 and latch 128. Latch 128 also receives a signal from SA ADC FSM 124. This signal is SA_ADC_OUT 125. SA ADC FSM 124 receives the difference between $V_{REF}$ and $V_{DDR}$ from SA COMP 122, and then SA ADC FSM 124 provides the code SA_ADC_OUT 125 to latch 128. SA ADC FSM 124 may include stored codes that correspond to various differences between $V_{REF}$ and $V_{DDR}$, and SA ADC FSM 124 may select and provide the correct code SA_ADC_OUT 125 to latch 128 based on the difference between $V_{REF}$ and $V_{DDR}$ that is received from SA COMP 122. In one example, SA_ADC_OUT 125 is an eight bit code, but other sizes of codes may be useful in other examples. Latch 128 stores the SA_ADC_OUT 125 code, which may be provided to CHG LUT 130 by any suitable internal circuitry. CHG LUT 130 also receives a peak current code (IPEAK_CODE) 140. IPEAK_CODE 140 may be any number of bits, and the code may be stored in CHG LUT 130. IPEAK_CODE 140 indicates to pulse generator 134 the peak allowable current through inductor 112 during the charging operations. A user may set the peak allowable current in an example. CHG LUT 130 is coupled to pulse generator 134 and provides an output to the pulse generator 134. DSG LUT 132 also receives IPEAK_CODE 140. DSG LUT 132 is also coupled to pulse generator 134 and provides an output to the pulse generator 134. Based on the codes and data stored in CHG LUT 130 and DSG LUT 132, pulse generator 134 provides a P_CTRL signal 142 to the gate of high-side transistor 106. Pulse generator 134 provides an N_CTRL signal 144 to the gate of low-side transistor 108. The control signals 142 and 144 turn on and off high-side transistor 106 and low-side transistor 108, respectively, during charge and discharge operations. In one example, based on the code SA_ADC_OUT 125 and the IPEAK_CODE 140, the pulse generator 134 sends the appropriate number of pulses (e.g., control signals 142 and 144) to perform the charge and discharge operations that raise $V_{DDR}$ until $V_{DDR}$ matches $V_{REF}$.

System 100 also includes DCDC comparator (DCDC COMP) 146. DCDC COMP 146 includes a first comparator input (e.g., a non-inverting input) that receives $V_{REF}$, a second comparator input (e.g., an inverting input) that receives $V_{DDR}$, and a comparator output that produces a DCDC_COMP_OUT signal 148. The DCDC_COMP_OUT signal 148 is provided to pulse generator 134. This signal triggers the DC-DC charging pulses of pulse generator 134 as described below.

System 100 also includes a zero cross comparator (ZC COMP) 150. ZC COMP 150 includes a first comparator input (e.g., a non-inverting input) coupled to SW_OUT node 110 and a second comparator input (e.g., an inverting input) coupled to ground 118. ZC COMP 150 produces a ZCC_OUT signal 152 at the comparator output. The ZCC_OUT signal 152 is provided to DSG LUT 132. ZC COMP 150 also receives a clock (CLK) signal 154 from pulse generator 134. The CLK signal 154 may enable ZC COMP 150 in an example.

In one example operation, the $V_{BAT}$ range is 1.7 to 3.8 V. System 100 regulates the output voltage $V_{DDR}$ to provide approximately 1.5 V at a load in this example. DCDC COMP 146 is an analog comparator. DCDC COMP 146 compares the output voltage $V_{DDR}$ to a predetermined threshold, such as the internal bandgap reference $V_{REF}$ (approximately 1.5 V in this example). System 100 operates to provide a steady output voltage of at least $V_{DDR}$. Therefore, if $V_{DDR}$ is equal to or higher than $V_{REF}$, the DCDC charging cycles are not performed by pulse generator 134, because $V_{DDR}$ is providing at least the target voltage to a load. In some examples, $V_{DDR}$ will eventually drop over time if charging operations are not performed. If $V_{DDR}$ is lower than $V_{REF}$, however, $V_{DDR}$ needs to be raised. If $V_{DDR}$ is lower than $V_{REF}$, the DCDC_COMP_OUT 148 signal triggers the DCDC operation at pulse generator 134. Pulse generator 134 provides the signals P_CTRL 142 and N_CTRL 144 to high-side transistor 106 and low-side transistor 108, respectively, to turn the transistors on and off and perform charging and discharging operations until $V_{DDR}$ reaches $V_{REF}$. In one example, pulse generator 134 may include a state machine (not shown in FIG. 1) to receive the DCDC_COMP_OUT 148 signal.

To charge inductor 112, the top switch (high-side transistor 106) is turned on with P_CTRL 142. If high-side transistor 106 is on, current flows through inductor 112 and $V_{DDR}$ increases (e.g., a charging operation). If P_CTRL 142 is on, N_CTRL 144 is off, so the bottom switch (low-side transistor 108) is off. During a discharge operation, P_CTRL 142 is off and N_CTRL 144 is on. Therefore, during discharge, high-side transistor 106 is off and low-side transistor 108 is on. At this time, current flows through inductor 112 and then through low-side transistor 108 into ground 118 to discharge the inductor 112, thereby decreasing $V_{DDR}$.

For the charging operation, the amount of time that high-side transistor 106 is on is based on a value read from CHG LUT 130 by pulse generator 134. Specifically, after pulse generator 134 receives the DCDC_COMP_OUT 148 signal (which triggers the pulse generator 134 to control the high- and low-side transistors 106, 108), pulse generator 134 reads a value from CHG LUT 130 to determine how long to keep P_CTRL 142 on. Digital controller 102 includes any suitable hardware, software, or digital logic to perform the actions described herein. The selection from CHG LUT 130 depends on two inputs: the peak current setting IPEAK_CODE 140 and the SA_ADC_OUT 125 signal provided by the latch 128. CHG LUT 130 stores the duration for which the high-side transistor 106 is kept on during the charging operation. The duration is based at least in part on the peak inductor current and the difference between $V_{DDR}$ and $V_{BAT}$. For the discharge operation, the time that low-side transistor 108 is on depends on IPEAK_CODE 140 and may be read from DSG LUT 132 by pulse generator 134.

For charging operations, previous systems perform the SA ADC measurement at the beginning of the charging operation. The SA ADC measurement performs a health check to determine if the battery is healthy enough to perform the charge operation. Based on the $V_{BAT}$ level, different charging time values may be selected. One objective is to keep the peak current flowing through inductor 112 at a constant value independent of $V_{BAT}$ level. In these previous systems, it takes a certain number of clock cycles to perform the SA ADC measurement (such as 11 clock cycles). While the SA ADC measurement is being performed, the current through the inductor is increasing because the pulse generator is performing a charging operation. Therefore, the lowest peak current through inductor may be as high as 55 mA, due to the time taken to complete the SA ADC measurement. This high peak current limits the efficiency of the DC-DC converter.

In examples described herein, rather than performing the SA ADC measurement at the beginning of each charging operation, the SA ADC measurement is triggered at regular intervals by the SA_TRIG signal 136. These regular intervals are independent of the charging operation. Software (e.g., executed by digital controller 102 or another processor or controller not shown in FIG. 2) may control the rate at which the SA ADC measurement is triggered in one example. The rate may depend on the nature of the supply power and its variations. In an example, a digital counter based scheme is implemented in controller 102 that prescales a source clock based on the SA ADC measurement rate to generate the periodic triggers (e.g., the 48 MHz clock provided to ADC trigger generation block 126). The trigger rate is configurable to any value or predetermined interval (e.g., every 1 microsecond (µs), 2 µs, 5 µs, 10 µs, etc.). A user may configure the trigger rate in one example. The SA ADC value is stored in latch 128 each time it is found. During a charging operation, the latched value in latch 128 is read by CHG LUT 130 to determine the number of charging cycles for the configured peak current setting (IPEAK_CODE 140). Because the latched value is used rather than performing a new SA ADC measurement, the charging time may be as low as one cycle and has no dependency on the SA ADC measurement time.

In an example, CHG LUT 130 stores a collection of different values. The IPEAK_CODE 140 may be a 3-bit setting in one example (8 different values). A user may set the IPEAK_CODE 140 and fix the maximum peak current that can flow into the inductor 112. For each of the eight peak current setting combinations along with the SA_ADC_OUT 125 code, pulse generator 134 or other logic or circuitry selects a charging value from CHG LUT 130 when a charging operation is initiated. A similar process occurs for the discharging durations using the DSG LUT 132. Therefore, the charging time is a function of the SA_ADC_OUT 125 code and IPEAK_CODE 140. The discharge time from DSG LUT 132 is a function of IPEAK_CODE 140. The LUTs 130 and 132 store the times that determine how long high-side transistor 106 and low-side transistor 108 are on for the charging and discharging operations, respectively.

System 100 also includes ZC COMP 150. In an example, after a discharge operation and a short delay (e.g., 20 ns), ZC COMP 150 is turned on by pulse generator 134, or by another signal from controller 102. CLK 154 may turn on ZC COMP 150 in one example. The output of ZC COMP 150 (ZCC_OUT 152) toggles if the current through inductor 112 crosses zero. Therefore, ZC COMP 150 detects if the inductor 112 current is above or below zero at the end of a discharge operation. A high ZCC_OUT 152 means the inductor 112 current is positive, and a low ZCC_OUT 152 means the inductor 112 current is negative. ZCC_OUT 152 is provided to DSG LUT 132. If ZCC_OUT 152 is high, the discharge time is increased by one clock cycle for the next discharge operation by updating DSG LUT 132. If ZCC_OUT 152 is low, the discharge time is decreased by one clock cycle for the next discharge operation by updating DSG LUT 132. The operation of ZC COMP 150 allows the inductor 112 current to move closer to zero for each subsequent discharge cycle.

As described with respect to FIG. 1, the SA ADC measurement is triggered to check the voltage supply health at regular intervals independent of the inductor charging operation. The trigger rate may be configurable as described above. If the voltage supply changes quickly, faster trigger rates may be selected. The SA ADC measurement output value is latched at the end of each measurement. The CHG LUT 130 reads the latched value (in latch 128) to determine the number of charging cycles for a given peak current setting (IPEAK_CODE 140). In the examples herein, the charging time may be as small as one cycle and has no dependency on the time taken for the SA ADC measurement. In one example, with a 4.7 µH inductor and a 10 milliamp (mA) load current, efficiency may be improved from 80.9% to 86.4%.

Figure 2:
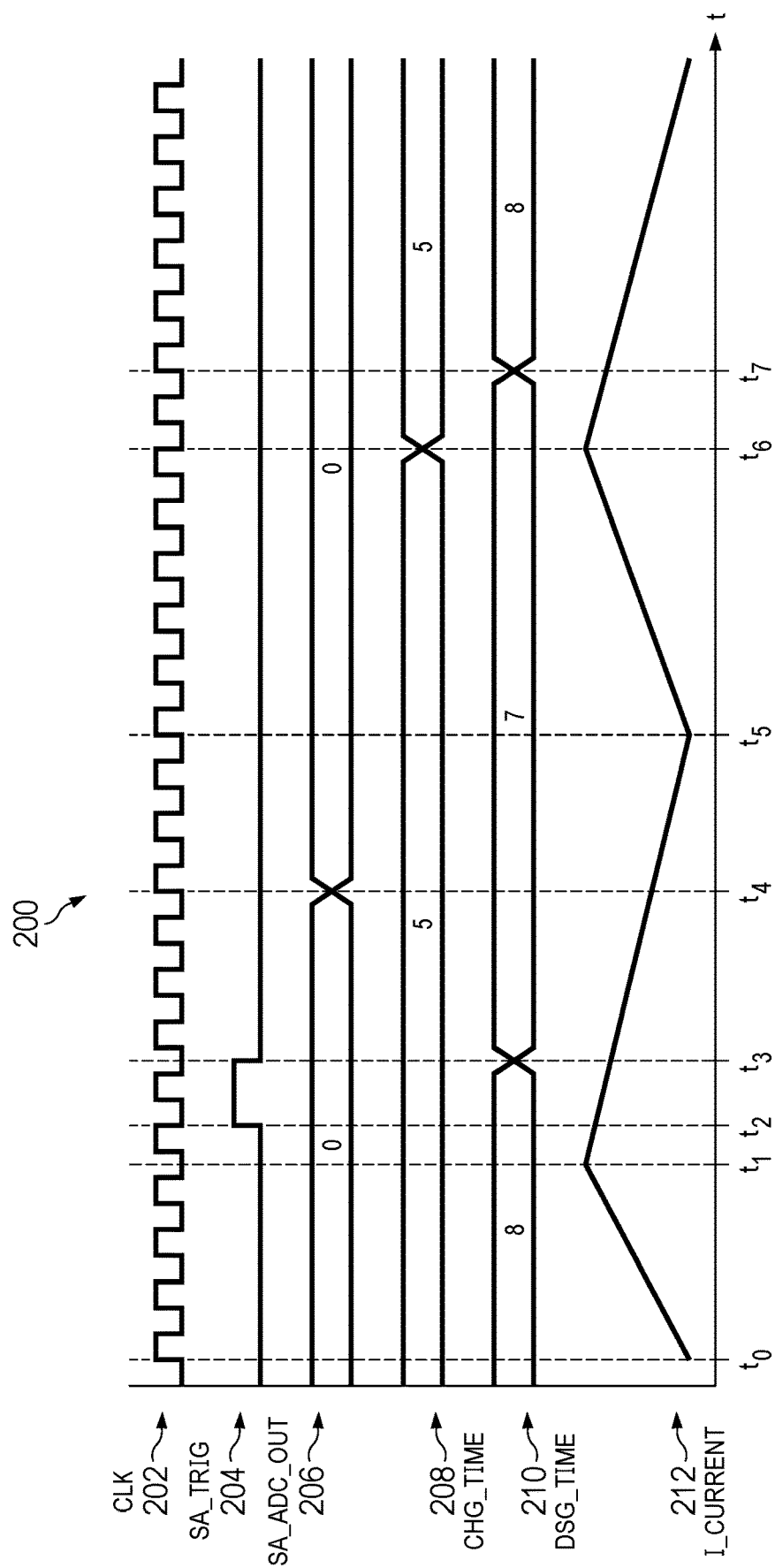
FIG. 2 is a collection of waveforms for a DC-DC converter in accordance with various examples.

FIG. 2 is a collection of waveforms 200 for a DC-DC converter in accordance with various examples herein. Waveforms 200 are example waveforms for different signals described above with respect to FIG. 1.

FIG. 2 includes a clock signal (CLK) 202. FIG. 2 also includes an SA_TRIG signal 204 and an SA_ADC_OUT code 206. FIG. 2 includes the charge time (CHG_TIME) 208 and the discharge time (DSG_TIME) 210, which indicate the number of clock cycles for the charge and discharge operations described above, respectively. FIG. 2 also includes the load current (L_CURRENT) 212, which is the current through inductor 112.

In this example, the charge and discharge times (and, therefore, the inductor 112 current) are decoupled from the SA ADC measurement. At time $t_0$, a charging operation begins, and L_CURRENT 212 begins to rise. In this example, the charge time 208 is 5, so the charging operation lasts for 5 clock cycles (CLK 202). The charge time 208 is retrieved from CHG LUT 130 at the start of the charging operation, and CHG LUT 130 retrieves the SA_ADC_OUT code from latch 128. In this example, charge time 208 remains 5 because the supply voltage is steady. SA_ADC_OUT code is 0 at time $t_0$ in this example (waveform 206).

At time $t_1$, a discharge operation begins, and L_CURRENT 212 begins to fall. The DSG_TIME is 8 (waveform 210), so the discharge operation will continue for 8 clock cycles. At time $t_5$, the discharge operation is complete, and another charge operation begins. L_CURRENT 212 begins to rise again at time $t_5$. The CHG_TIME 208 is still 5 clock cycles at time $t_5$, so this charging operation also lasts for 5 clock cycles. At time $t_6$, another discharge operation begins, and L_CURRENT 212 begins to fall.

In this example, at time $t_3$, the discharge time is updated from 8 clock cycles to 7 clock cycles. As described above, the ZC COMP 150 either increases or decreases the discharge time by one clock cycle for the next discharge operation by updating DSG LUT 132. The updated discharge time occurred at time $t_3$ in this example. Therefore, for the next discharge cycle (beginning at time $t_6$), the discharge cycle will last 7 clock cycles.

FIG. 2 also shows an SA trigger operation (waveform 204). SA_TRIG is decoupled from the charge and discharge cycles, and occurs at the time specified by the trigger rate (e.g., every 1 µs, 2 µs, etc.). In this example, an SA trigger operation occurs at time $t_2$, shown in waveform 204. As shown in FIG. 2, the charge and discharge cycles of waveform 212 are independent of the timing of the SA trigger in waveform 204. The SA trigger in waveform 204 initiates an SA ADC measurement, which checks the health of the voltage supply and updates the SA_ADC_OUT 125 code stored in latch 128. Here, SA_ADC_OUT is updated at time $t_4$ (waveform 206). In this example, the SA_ADC_OUT value remains 0 at time $t_4$, which indicates that the voltage supply was steady compared to the previous SA_ADC_OUT value. Therefore, the charge time (waveform 208) remains 5 clock cycles at time $t_6$. If the health of the voltage supply had changed, and the SA_ADC_OUT value had also changed (e.g., from 0 to 1), then the charge time would update to the new charge time at time $t_6$.

FIG. 2 shows that the SA ADC measurement and the update of the SA_ADC_OUT 125 code is independent of the charging and discharging operations. The charging and discharging operations use the number of clock cycles stored in LUTS 130 and 132, respectively. The charging time is read from CHG LUT 130 at the beginning of each charge cycle without waiting for an SA ADC measurement to complete. This example improves the efficiency of the DC-DC converter.

Figure 3:
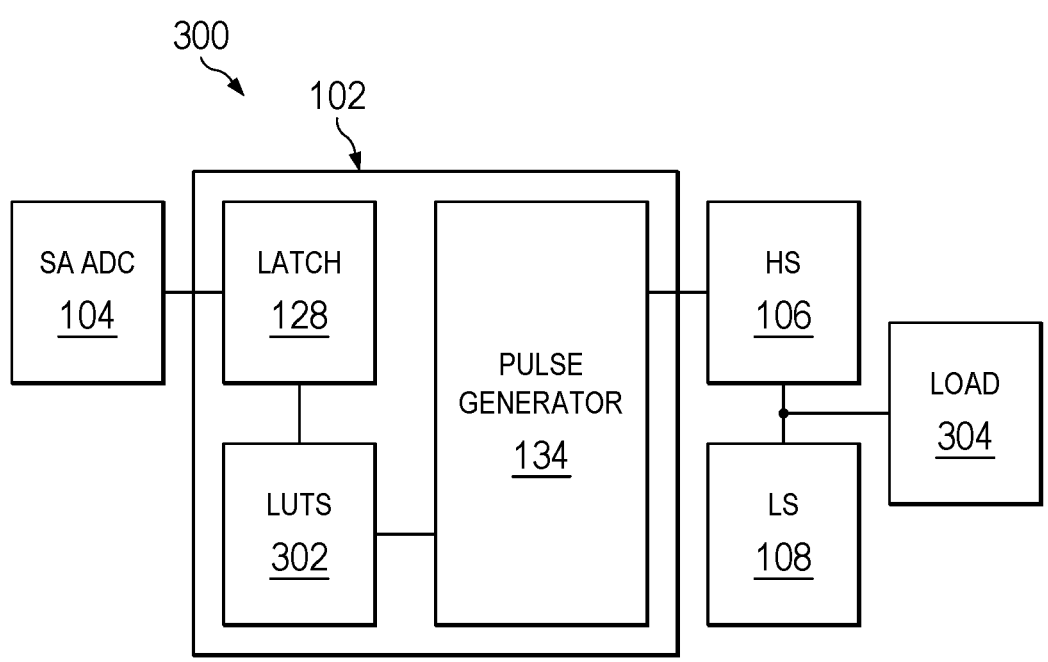
FIG. 3 is block diagram of a system for controlling inductor peak current in a DC-DC converter in accordance with various examples.

FIG. 3 is a block diagram of a system 300 for controlling inductor peak current in a DC-DC converter in accordance with various examples herein. Some of the components in system 300 are described above with respect to FIG. 1, and like numbers denote like components.

System 300 includes a controller 102 and an SA ADC 104. The components in controller 102 may be implemented in hardware, software, or digital logic in one example. Controller 102 include a latch 128, lookup tables (LUTS) 302, and a pulse generator 134. Latch 128 stores an SA_ADC_OUT code provided by SA ADC 104. The LUTS 302 may include charge times and discharge times, which may be stored in any number of tables in any suitable format. Pulse generator 134 provides pulses to a high-side (HS) transistor 106 and a low-side (LS) transistor 108. The number of pulses for the charge and discharge operations are found in LUTS 302. The HS 106 and LS 108 provide current to a load 304, which may be an inductive load.

Figure 4:
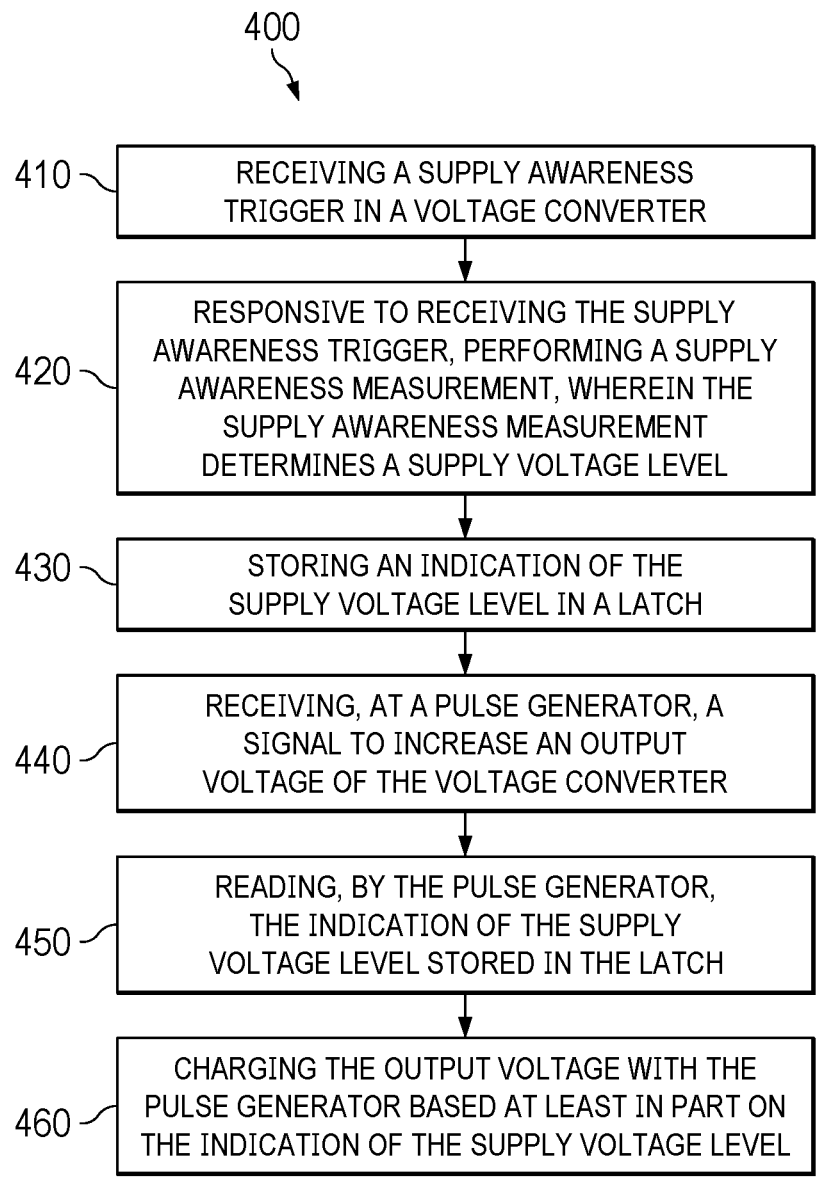
FIG. 4 is flow diagram of a method for controlling inductor peak current in a DC-DC converter in accordance with various examples.

FIG. 4 is a flow diagram of a method 400 for controlling inductor peak current in a DC-DC converter in accordance with various examples herein. The steps of method 400 may be performed in any suitable order. Any suitable hardware or digital logic may perform method 400 in some examples. The components described above in system 100 may perform method 400 in some examples.

Method 400 begins at 410, where a voltage converter receives a supply awareness (SA) trigger. In one example, the SA trigger (e.g., SA_TRIG 126) is provided at a predetermined interval, such as every 1 µs. Any suitable software, digital hardware, processor, or controller may provide the SA trigger.

Method 400 continues at 420, where responsive to receiving the supply awareness trigger, an SA ADC 104 performs a supply awareness measurement, where the supply awareness measurement determines a supply voltage level. In one example, SA ADC 104 determines a code that provides an indication of the health of the supply or battery voltage. The code may be based on the difference between the supply voltage and an output voltage of the DC-DC converter. The code is used to select a number of charging cycles for the DC-DC converter. The code may be SA_ADC_OUT 125 in one example.

Method 400 continues at 430, where an indication of the supply voltage level is stored in a latch. The latch may be latch 128 in one example, and the indication that is stored may be SA_ADC_OUT 125 in one example.

Method 400 continues at 440, where a pulse generator receives a signal to increase an output voltage of the voltage converter. The pulse generator may be pulse generator 134 in one example. The pulse generator may receive the signal because the output voltage has fallen below a predetermined threshold.

Method 400 continues at 450, where the pulse generator reads the indication of the supply voltage level stored in the latch. In one example, the pulse generator may retrieve a number of charging cycles from a lookup table, such as CHG LUT 130. CHG LUT 130 may read the indication of the supply voltage level stored in latch 128 and then provide the number of charging cycles to the pulse generator, where the number of charging cycles is based at least in part on the indication of the supply voltage level.

Method 400 continues at 460, where the pulse generator charges the output voltage based at least in part on the indication of the supply voltage level. The pulse generator charges the output voltage with a certain number of charge pulses or charging cycles, which is based on the indication of the supply voltage level as described above. The number of charge pulses may also be based at least in part on a peak current code, such as IPEAK_CODE 140 in one example.

In examples herein, the SA ADC measurement is triggered to check the voltage supply health at regular intervals independent of the inductor charging operation. This allows the DC-DC converter to achieve higher efficiency for a specific inductor value. The improved efficiency helps to achieve lower device active power and reach power consumption targets. The solution also enables the DC-DC converter to use smaller inductor values, because the peak current is adjustable by a user. The SA trigger rate may also be adjusted based on the type and variation of power supply used in the end application.

In this description, the term "couple" may cover connections, communications or signal paths that enable a functional relationship consistent with this description. For example, if device A provides a signal to control device B to perform an action, then: (a) in a first example, device A is directly connected to device B; or (b) in a second example, device A is coupled to device B through intervening component C if intervening component C does not alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A voltage converter, comprising:
   a pulse generator;
   a high-side transistor having a gate coupled to the pulse generator, a source coupled to a first voltage terminal, and a drain coupled to an output node;
   a low-side transistor having a gate coupled to the pulse generator, a source coupled to a second voltage terminal, and a drain coupled to the output node;
   a charge lookup table coupled to the pulse generator, wherein the charge lookup table is configured to provide a charge duration;
   a discharge lookup table coupled to the pulse generator, wherein the discharge lookup table is configured to provide a discharge duration; and
   a latch coupled to the charge lookup table, wherein the latch is configured to store an indication of a supply voltage.

2. The voltage converter of claim 1, further comprising:
   a trigger generator configured to trigger a measurement of the supply voltage.

3. The voltage converter of claim 1, further comprising:
   a comparator having a comparator output, a first comparator input, and a second comparator input, wherein the first comparator input is coupled to the output node, the second comparator input is coupled to a voltage reference generator, and the comparator output is coupled to the pulse generator.

4. The voltage converter of claim 1, further comprising:
   a comparator having a comparator output, a first comparator input, and a second comparator input, wherein the first comparator input is coupled to the output node, the second comparator input is coupled to the supply voltage, and the comparator output is configured to produce a difference between the supply voltage and an output voltage at the output node.

5. The voltage converter of claim 1, further comprising:
   a comparator having a comparator output, a first comparator input, and a second comparator input, wherein the first comparator input is coupled to the drain of the low-side transistor, the second comparator input is coupled to ground, and the comparator output is coupled to the discharge lookup table.

6. The voltage converter of claim 1, wherein the charge lookup table provides the charge duration based at least in part on a peak current setting and the supply voltage.

7. The voltage converter of claim 1, wherein the discharge lookup table provides the discharge duration based at least in part on a peak current setting.

8. A method, comprising:
receiving a supply awareness trigger in a voltage converter;
responsive to receiving the supply awareness trigger, performing a supply awareness measurement, wherein the supply awareness measurement determines a supply voltage level;
storing an indication of the supply voltage level in a latch;
receiving, at a pulse generator, a signal to increase an output voltage of the voltage converter;
reading, by the pulse generator, the indication of the supply voltage level stored in the latch; and
charging the output voltage with the pulse generator based at least in part on the indication of the supply voltage level.

9. The method of claim 8, wherein charging the output voltage includes turning on a transistor coupled to the pulse generator.

10. The method of claim 8, wherein the pulse generator charges the output voltage for a duration, wherein the duration is based at least part on the indication of the supply voltage level.

11. The method of claim 10, wherein the duration is based at least in part on a peak current setting.

12. The method of claim 8, further comprising:
discharging the output voltage with the pulse generator based at least in part on a peak current setting.

13. The method of claim 12, wherein discharging the output voltage includes turning on a transistor coupled to the pulse generator.

14. The method of claim 8, wherein the supply awareness trigger is received at a predetermined interval.

15. The method of claim 8, further comprising:
receiving the signal to increase the output voltage responsive to the output voltage falling below a predetermined threshold.

16. The method of claim 8, wherein the indication of the supply voltage level includes a difference between the supply voltage level and the output voltage.

17. The method of claim 8, wherein the supply awareness trigger is decoupled from the pulse generator.

18. A system, comprising:
a pulse generator;
a supply awareness trigger generator configured to trigger a supply awareness measurement, wherein the supply awareness measurement determines a difference between a supply voltage level and an output voltage;
a high-side transistor having a gate coupled to the pulse generator, a source coupled to a first voltage terminal, and a drain coupled to an output node;
a low-side transistor having a gate coupled to the pulse generator, a source coupled to a second voltage terminal, and a drain coupled to the output node, wherein the high-side transistor and the low-side transistor produce the output voltage;
a charge lookup table coupled to the pulse generator, wherein the charge lookup table is configured to provide a charge duration based on the supply awareness measurement and a peak current setting;
a discharge lookup table coupled to the pulse generator, wherein the discharge lookup table is configured to provide a discharge duration based on the peak current setting; and
a latch coupled to the charge lookup table, wherein the latch is configured to store the supply awareness measurement.

19. The system of claim 18, wherein the pulse generator is configured to charge the output voltage for the charge duration.

20. The system of claim 18, wherein the pulse generator is configured to charge the output voltage by turning on the high-side transistor.

* * * * *